United States Patent [19]

Kirrish

[11] 4,310,273

[45] Jan. 12, 1982

[54] FASTENER ASSEMBLY

[75] Inventor: Hail Kirrish, Rockford, Ill.

[73] Assignee: Textron Inc., Providence, R.I.

[21] Appl. No.: 34,617

[22] Filed: Apr. 30, 1979

[51] Int. Cl.³ .................... F16B 35/04; F16B 39/282
[52] U.S. Cl. .................................. 411/338; 411/371; 411/542; 411/907
[58] Field of Search ............... 85/1 JP, 4; 411/338, 411/371, 542, 907

[56] References Cited

U.S. PATENT DOCUMENTS

| | | | |
|---|---|---|---|
| 3,247,752 | 4/1966 | Greenleaf et al. | 85/9 R |
| 3,803,972 | 4/1974 | Deutsher | 85/1 JP |
| 3,889,569 | 6/1975 | Fanciullo | 85/1 JP |
| 4,033,243 | 7/1977 | Kirrish et al. | 85/1 JP |

FOREIGN PATENT DOCUMENTS

| | | | |
|---|---|---|---|
| 2611395 | 7/1977 | Fed. Rep. of Germany | 85/1 JP |
| 929176 | 6/1963 | United Kingdom | 85/1 JP |

*Primary Examiner*—Francis K. Zugel
*Attorney, Agent, or Firm*—Trexler, Bushnell & Wolters, Ltd.

[57] ABSTRACT

A novel fastener assembly is disclosed for use in securing a frame section to a composite panel or the like, said fastener assembly being dielectrically insulated from said frame section to prevent galvanic action. The fastener assembly is comprised of a bolt member adapted for engagement in a bore formed in said frame section, said bolt member having an enlarged head portion including annular axially facing groove means, and an annular axially extending non-conductive elastomeric gasket member disposed in said groove means, and a nut member having an enlarged head portion for engagement with said bolt member. The nut member is disposed in a coaxial bore formed in said composite panel and engaged with said bolt member also disposed in said bore. Upon assembly the gasket member is clamped between the frame and the enlarged head on the bolt and is deformed axially and radially. That is, the gasket is extroded into the spore between the bolt member and the frame to insulate said bolt member from said frame section. In addition, the aforementioned gasket member provides a watertight joint when said bolt and nut members are brought into clamping engagement with said frame and panel sections.

3 Claims, 5 Drawing Figures

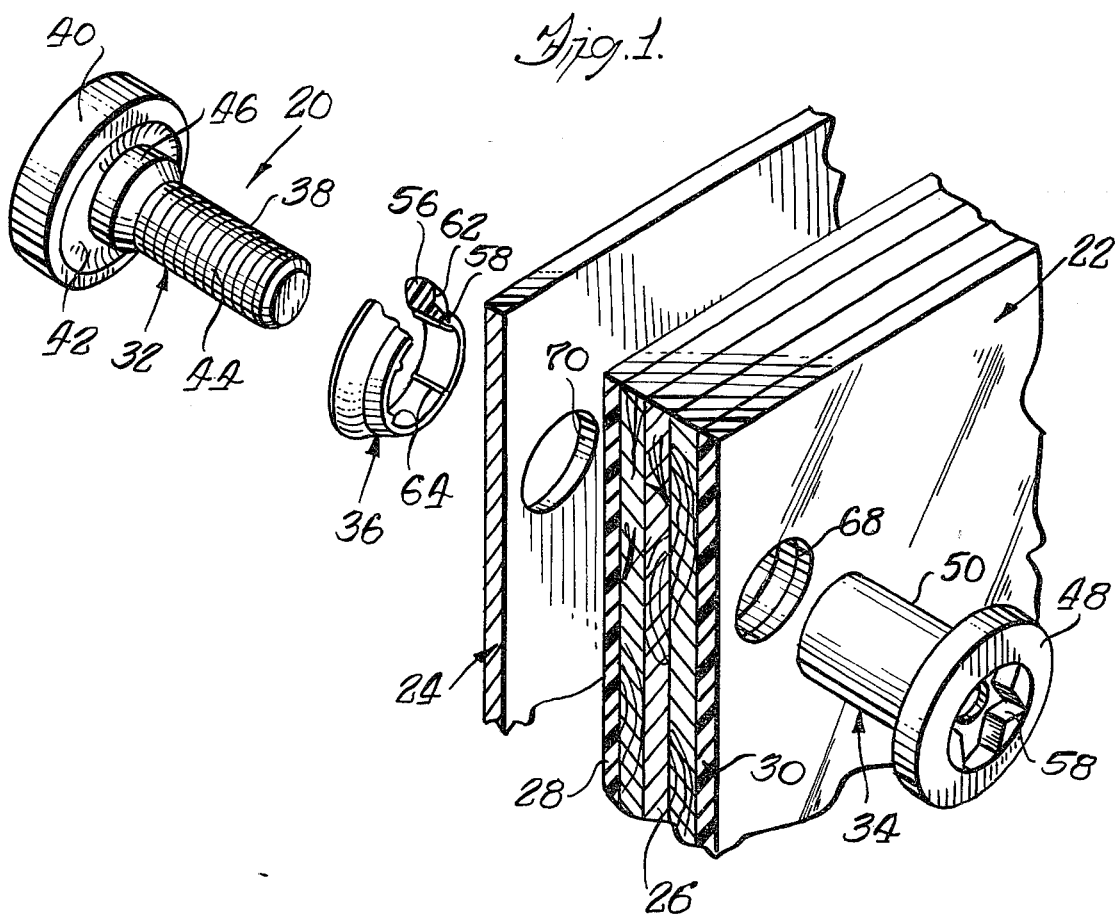
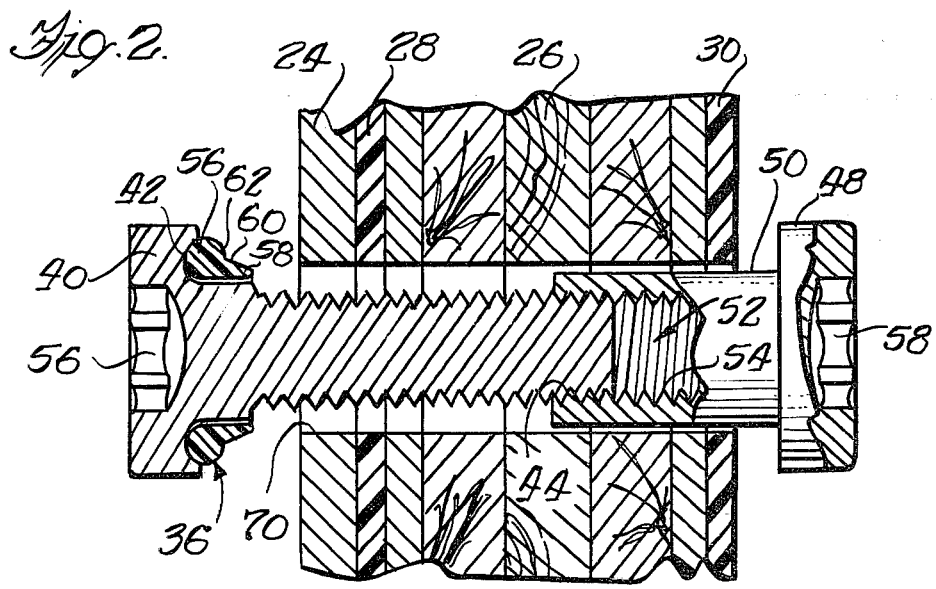

FASTENER ASSEMBLY

BACKGROUND OF THE INVENTION

The present invention pertains to a fastener assembly, and more particularly to a fastener assembly for use in joining a composite panel or the like to a section of metal framing, as is used in the construction of large shipping containers or trailer bodies.

In the last several years, the transportation industry has moved rapidly toward the fabrication of these containers from fiberglass, reinforced polyester-plywood panels which are fastened to a metal framework. In addition, trailer truck bodies are also being constructed in a said manner.

It should be noted, that a great number of joints are required in the assembly of each container or trailer body; for example, a normal 40' trailer will require between five hundred and six hundred separate fastener assemblies or joints. As the rigidity of the resultant structure depends soley on the strength of these joints, each fastener assembly must provide a high degree of clamping force throughout the life of the container. Further the joint must be watertight so that moisture cannot enter and weaken the plywood laminate. The fastener assembly of the present invention provides the abovementioned features, and an additional insulatory faction to prevent galvanic corrosion that is not obtained with the prior art assemblies presently being used in container constructions, as will be explained in some detail hereinafter.

Consideration is now directed briefly to the prior art type of fastener assembly used in container construction. In this regard, these assemblies normally employ a bolt member having an externally threaded elongate shank portion, a nut member having an internally threaded elongate sleeve portion; each of said members having an enlarged head portion. The shank and sleeve portions of the members are coaxially engaged in a through bore formed in the frame and panel sections in order to bring said sections into clamping engagement. The external enlarged head portion, which bears against the metal frame section, is generally provided with a deformable gasket to render the joint impervious to the influx of moisture which would otherwise impregnate the composite panel and weaken the joint. A typical prior art fastener assembly is illustrated in U.S. Pat. No. 4,033,243.

While the prior art types of fastener assemblies have been used extensively, they are possessed of a number of inherent disadvantages that are overcome by the present invention. For example, the frame sections described herein are generally constructed of aluminum or aluminum alloy. The fastener assemblies, in order to afford strength and resist the forces of tortional loading, are manufactured from steel or other ferrous alloy. As the use of conventional ferrous fasteners to secure aluminum frames results in contact between dissimilar metals which are constantly exposed to rain, road salt or the like, the resultant galvanic corrosion will eventually weaken the joint by a reduction of the bearing surfaces thereof. In addition, as the metal corrodes, capillary passageways may develop whereby water and contained corrosive ions permeate the bore to accelerate the corrosion and further weaken the plywood panel.

Some prior art assemblies attempt to avoid this corrosion by use of aluminum fasteners, but aluminum fasteners of appropriate size are unable to withstand the forces applied to the joint and are susceptible to failure within a short period of time. Non-metallic washers which cause the head portion of the fastener to stand clear of the frame section fail to isolate the shaft portion of the fastener from the through bore formed in the frame and thus allow hidden corrosion within the joint. When this corrosion extends past the external washer, the waterproof seal is broken allowing moisture to further extend the galvanic action and weaken the plywood laminate.

The present invention not only provides a strong moistureproof joint, but does so in a manner which overcomes the above-discussed disadvantages of the prior art assemblies. That is to say, the present invention provides a strong moistureproof joint which will not weaken in service due to galvanic corrosion.

Briefly, the fastener assembly of the present invention achieves the above-discussed advantages due to its unique construction. In this regard, it should be noted that there is provided a fastener assembly having an external enlarged head portion containing a novel annular groove means adapted for extruding a specially constructed annular gasket member both axially to isolate the elongate portion from the through bore, and radially to insulate the external head portion from the surface of the frame section. The gasket member and nut member are constructed such that the elongate portion of the fastener assembly is easily centered in the through bore.

The bolt member and nut member of the fastener assembly preferably each contain drive recesses for engagement by a standard power driven wrench or the like. However, conventional enlarged head configurations having multisided head portions for receiving a suitable wrench may be used.

Numerous other advantages of the present invention will become more apparent from the detailed description of the illustrated embodiment and the accompanying drawings.

DESCRIPTION OF THE DRAWINGS

FIG. 1 is a perspective, exploded view of a fastener assembly constructed in accordance with the present invention, disposed in relation to an apertured frame and panel section;

FIG. 2 is a sectional view illustrating the fastener assembly of the present invention upon insertion of the bolt member and initial engagement of the nut member therewith, and prior to engagement of the gasket member with said frame section;

DESCRIPTION OF THE ILLUSTRATED EMBODIMENT

Figure 3:
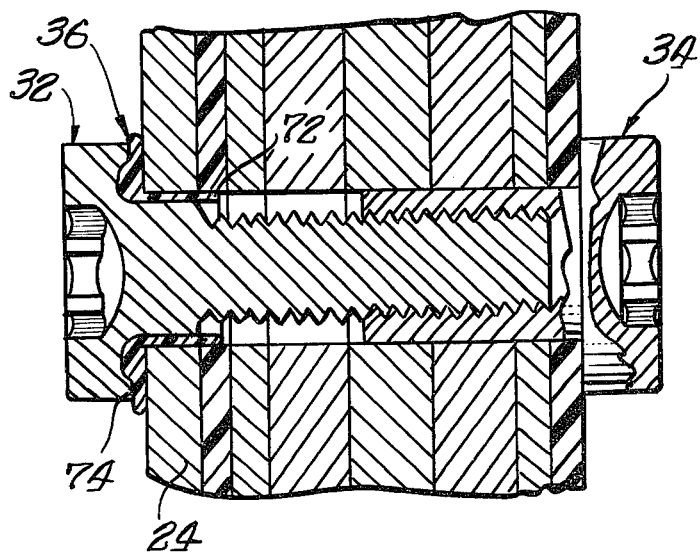
FIG. 3 is a sectional view of the completed insulated joint.

The drawings illustrate a preferred form of the fastener assembly of the present invention, which assembly is designated generally 20. The assembly 20 is utilized to achieve clamping engagement between a component panel section, or the like, 22 and a metal frame section 24. The panel section 22 may be of varied construction, the drawings illustrating a section which is constructed of a plywood laminate 26 with layers of fiberglass reinforcement 28 and 30 on the opposite sides thereof.

The fastener assembly 20 is comprised of a bolt member 32, a nut member 34 engageable therewith, and a gasket member 36 of novel design and function. Bolt member 32 is possessed with a number of novel structural features that contribute to the overall operation of the assembly in the desired manner. More specifically, the bolt member 32 includes an elongate shank portion 38, and an enlarged head portion 40 with an axially facing groove 42 on the innersurface thereof. On the elongate shank portion 38 opposite the enlarged head portion 40, there is provided an externally threaded segment 44. Disposed on shank portion 38 intermediate the threaded segment 44 and head portion 40, is an enlarged unthreaded segment 46, which is preferably sized to be somewhat greater than the crest diameter of threaded segment 44.

Nut member 34 is specially constructed for the overall function of fastener assembly 20. In this regard, nut member 34 includes an enlarged head portion 48, and an elongate sleeve portion 50. As is shown in FIG. 2, a bore 52 extends through elongate sleeve portion 50, the bore 52 being internally threaded, as indicated by reference character 54. Elongate sleeve portion 50 is sized such that said portion 50 is firmly received in panel through bore 68 in order to provide the co-axial engagement of shaft portion 38 with frame through bore 70 upon engagement of said portion, as more fully described hereinafter.

Enlarged head portions 40 and 48 are preferably formed with drive tool receiving recesses 56 and 58 respectively, although other means known in the art may alternatively be employed. For example, the elongate shaft portion 38 may extend past panel section 22 to engage a conventional nut member, not shown, comprising a multisided head portion for receiving a suitable wrench.

The gasket member 36 will now be considered, and will be discussed essentially with respect to the cross-section slope thereof. As is shown in FIG. 2, gasket member 36 is seen to have a bulbous end portion 56 received partially within groove 42, and an axially extending annular lip portion 58 defined by tapered wall 60. The bulbous end portion 56 and lip 58 meet to define an outer shoulder 62. As is seen in FIG. 1, gasket member 36 further includes a plurality of internal, raised seating ridges 64 to aid in mounting and retaining gasket member 36 on the unthreaded portion 46. Of further note is the fact that the wall surface 60 is conically tapered, such that the outer diameter of the lip portion 58 is less at its terminus or free end than at any other location along the length thereof. The significance of this dimensional feature will be discussed more fully hereinafter.

Preparatory to assembly, of the fastener arrangement 20 to provide the joint a through bore 68 is formed in the composite panel section 22 and a bore 70 formed in frame section 24, as illustrated in the FIG. 1. Through bore 68 is preferably sized to be somewhat greater than the diameter of elongate sleeve portion 50 to allow insertion of nut member 34 and to maintain the bore 52 in a coaxial relationship with through bores 68 and 70. Gasket member 36 is mounted upon the unthreaded portion 46 of bolt member 34, with the bulbous end portion 56 of said gasket member partially received in groove 42. The gasket member 36 is sized to facilitate placement on the unthreaded portion 46, with the inner ridges 64 being of sufficient size to secure the member 36 in place. As an additional matter, the bore 70 is sized to be slightly larger than, or approximately equal to the outer diameter of the free end of the lip portion 58. As such, it is assured that upon tightening of the joint, a segment of said lip portion 58 will enter the bore 70, disposed between the bore wall and the unthreaded portion 46.

Nut member 34 is also engaged in the panel through bore 68, and bolt member 32 carrying gasket member 36 is inserted in through the bore 70 in frame 24, whereupon members 32 and 34 are rotated to engage threaded sections 44 and 54 thereof as is shown in FIG. 2. Continued engagement of nut member 34 in bolt member 32 may be attained by use of a standard power driver or the like employing a drive tool engageable in the drive recesses 56 and 58.

As the respective threaded segments 44 and 54 on bolt member 32 and nut member 34 are engaged, enlarged head portions 40 and 48 are drawn toward engagement with the opposed surfaces of the panel and frame sections until annular lip portion 58 of gasket member 36 is engaged by the edge of the frame through bore 70, FIG. 3.

Preferably, the bore 70 is slightly larger than the tapered end or tip of the gasket, such that initially the tip will enter the bore 70. As clamping engagement is increased the tapered conical surface 60 is brought into engagement with the edge of the bore 70 effecting a combination shearing and wedging action. As such a portion 72 of the gasket material is displaced or extroded into the space between the frame bore 70 and the shank portion 46 about the entire periphery of said shank portion, which gasket material 72 serves to center the bolt member 32. Continued compression of the gasket 36 will cause the engagement of the edge of bore 70 with the tapered portion 60 to increase, with the gasket member 36 being evenly sheared and inner lip portion 72 being further extruded between frame section 24 and unthreaded segment 46 of bolt member 32. In addition, due to the elastomeric composition of gasket member 36, a portion of the gasket which defines the tapered wall 60 is sheared and forced axially toward groove 42 of enlarged head portion 40. As will be explained more fully hereinafter, due to the elastomeric composition of gasket member 36, and the multi radius shape of groove 42, the gasket material is forced axially as well as radially, tending to increase the extrusion of portion 72 axially between frame 24 and shank portion 64. Further, the design of the groove serves to maintain the portion 72 in position and prevent it from "creeping" back, axially.

Figure 4:
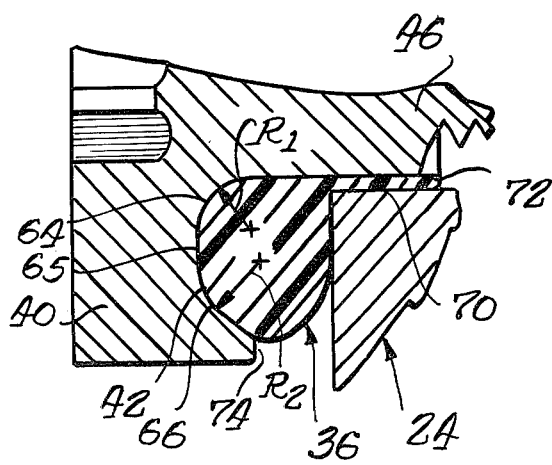
FIG. 4 is a partial sectional view of the fastener assembly upon initial engagement of the gasket member, with a portion thereof extroded into the through bore formed in the frame section.

Turning now to FIG. 4 for a more detailed description of the advantages presented by the construction of groove 42, said groove faces toward the shank portion 38, and is multi radiused. That is to say the groove 42 comprises a polysentric multi radius curve such that the radial generatrix of inner groove portions 64, indicated by reference character $R_1$ is smaller than the radial generatrix $R_2$ of outer groove portion 66. In addition, groove portions 64 and 66 may be separated by intermediate wall portions.

Figure 5:
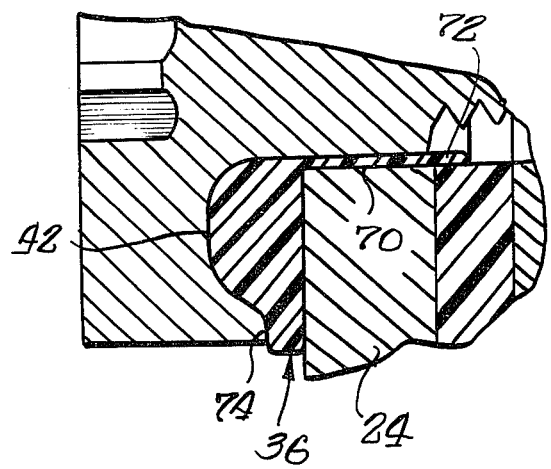
FIG. 5 is a partial sectional view of the fastener assembly upon further engagement, with the enlarged head portion deforming the gasket member outwardly toward the periphery of the enlarged head portion.

Looking now to FIGS. 4 & 5, it should be noted that shearing of the gasket member 36 continues until the shoulder portion 62 abuts the frame 24. Once this occurs the bulbous portion 56 of the gasket is trapped between the enlarged head 40 and frame 24. Due to the multi-radiused shape of the groove 42 the gasket material is confined, and portion thereof is forced radially inward to further the extrusion of the gasket portion 72 into the space between the frame bore 70 and the unthreaded portion 46. A further portion or segment of gasket material will be forced radially outward toward the edge 74 of the enlarged head portion 40. As compression of the gasket 36 continues toward the fully seated position for the fastener assembly 20, the FIG. 5 condition is reached. As can be seen the gasket 36 has been extroded past the edge 74 of the bolt. Also the shearing and extrusion of the inner gasket material, initially defined by the lip portion 58 and now shown by segment 72 will extend into bore 70-68 past the metal frame 24. As such, contact between the bolt 32 and the metal frame 24 is precluded by the now deformed gasket 36. Further, due to the composition of the gasket 36 it functions as an insulator to preclude galvanic corrosion between said bolt and frame.

Accordingly, once the fastener assembly 20 is fully seated, as is shown in FIG. 3, there is produced a joint which achieves all of the advantages as discussed above. Most significantly, a strong, waterproof easily assembled joint has been achieved wherein contact between dissimilar metals is eliminated. While there is disclosed a number of embodiments of a novel fastener assembly, it is envisioned and anticipated that those skilled in the art may devise additional variations and modifications, which fall within the spirit and scope of the invention as defined by the claims appended hereto.

The invention is claimed as follows:

1. A structural joint, comprising, in combination, a fastener assembly, a section of composite panel, or the like, and a rigid metal frame section to which said composite panel is attached, wherein both said panel and frame section define a through bore, said fastener assembly being disposed in said bore in clamping engagement with said panel and frame section to define said structural joint therebetween, said fastener assembly comprising, a bolt member having a first enlarged rigid head portion at one end and an elongate shank portion, said shank including an externally threaded segment, and an internally threaded nut member having a second enlarged rigid head portion, drive tool accommodating means on at least one of said bolt and nut members such that said enlarged head portions can be drawn into clamping engagement with said panel and frame sections, with the enlarged head portion on the one of said members to engage said frame section including annular axially facing groove means, and an annular non-conductive elastomeric gasket member carried on an elongate portion of said one member, said gasket member including a bulbous end portion partially disposed in said groove, said groove means including a pair of annular radiused portions and an annular axially facing wall portion disposed intermediate said radiused portions, said gasket bulbous end portion being disposed in said groove and being of greater volume than said groove means, and an axially extending annular lip portion at the opposite end thereof, said lip portion being of a frusto-conical configuration converging in a direction away from said bulbous end portion, and said lip portion having an initial outer diameter proximate the free end thereof that is less than the diameter of said frame section bore and a major outer diameter greater than said frame section bore, said lip portion and said bulbous end portion meeting to define generally radially disposed axially facing shoulder means axially intermediate said gasket member, such that upon initial clamping engagement, said free end of the gasket lip portion will freely enter said frame section bore, with said annular lip portion being forced into the space between said frame section bore and the elongate portion of said one member disposed in said bore, with said gasket shoulder means engaging against said frame section to promote deformation of said bulbous end portion, with said radiused surfaces and said axially facing wall portion of the groove means serving to force the remainder of the annular lip into the space between said frame section bore and said elongate portion of said one member disposed in said bore, and also directing the material of said bulbous end portion to be deformed and forced radially outward of the groove to extend at least to the periphery of said enlarged head portion of said one member, said gasket member thereby extending axially of said frame bore in surrounding relation to the portion of said one member disposed in said bore, and also extending radially to underlie the enlarged head portion of said one member, thus serving to insulate said one member from said frame section and prevent galvanic corrosion, while also serving to seal against the entrance of moisture through said frame section bore.

2. A fastener assembly according to claim 1 wherein said gasket includes an internal bore with axially extending circumferentially disposed mounts ribs formed thereon.

3. A fastener assembly according to claim 1 wherein said gasket member is disposed circumjacent an unthreaded segment of said bolt member.

* * * * *

UNITED STATES PATENT AND TRADEMARK OFFICE
CERTIFICATE OF CORRECTION

PATENT NO. : 4,310,273
DATED : January 12, 1982
INVENTOR(S) : HAIL KIRRISH

It is certified that error appears in the above-identified patent and that said Letters Patent are hereby corrected as shown below: On the title page In the abstract, line 18, change "extroded into the spore" to --extruded into the space--;

Column 1, line 21, change "soley" to --solely--;

Column 2, line 56, change "extroded" to --extruded--;

Column 4, lines 34-35, change "extroded" to --extruded--;

Column 5, line 12, change "extroded" to --extruded--.

Signed and Sealed this

Sixth Day of July 1982

[SEAL]

Attest:

GERALD J. MOSSINGHOFF

Attesting Officer  Commissioner of Patents and Trademarks